United States Patent Office 2,863,722
Patented Dec. 9, 1958

2,863,722

CHLORINE DIOXIDE PRODUCTION

William Howard Rapson, Toronto, Ontario, Canada, assignor to Hooker Chemical Corporation, Niagara Falls, N. Y., a corporation of New York No Drawing. Application March 8, 1955
Serial No. 493,050

4 Claims. (Cl. 23—152)

This invention relates to a process for the manufacture of chlorine dioxide, and is more particularly concerned with such a procedure which utilizes a chlorate, a chloride and a strong acid solution.

Chlorine dioxide, in recent years, has achieved considerable commercial significance in the field of pulp bleaching, water purification, fat bleaching, removal of phenols from industrial wastes, textile bleaching, and certain other oxidizing procedures. Usually, it is necessary to generate chlorine dioxide at the point of use, because of its explosive nature at higher concentrations and the attendant difficulty of transportation. Procedures for the manufacture of chlorine dioxide which have been previously proposed require very careful control of reaction conditions, often utilizing expensive reducing agents, or require rather elaborate equipment, to obtain a good yield of chlorine dioxide from sodium chlorate.

It is a principal object of the present invention to provide a process for the preparation of chlorine dioxide which is relatively simple to operate, uses cheap chemicals, gives a high yield of chlorine dioxide from chlorate, is fully continuous, and which does not require a large capital outlay for equipment.

Still another object of the present invention is to provide a process for the preparation of chlorine dioxide and chlorine in a substantially 2 to 1 molecular ratio.

Another object of the present invention is to provide a process for the preparation of chlorine dioxide which requires only a chlorate, a chloride, and a concentrated acid as the reactants, is not dependent upon an expensive reducing agent or a careful control of gas flow, and which can be carried out at relatively low temperatures without addition or removal of heat.

A further object of the present invention is to provide a process which utilizes a relatively dilute solution of chlorate and chloride, in a relatively concentrated solution of acid, and thereby reduces the explosion hazard in event of accidental breakage or interruption of solution or gas flow. Other objects will become apparent hereinafter.

I have found that a high yield of chlorine dioxide can be obtained from a very dilute solution of chlorate in relatively concentrated acid solution, by reaction with a very low concentration of chloride in the same solution, producing approximately one-half mole of chlorine for each mole of chlorine dioxide, according to the following equation:

$$2ClO_3^- + 2Cl^- + 4H^+ \rightarrow 2ClO_2 + Cl_2 + 2H_2O$$

Representative strong acids which are suitable include, for example, sulphuric, phosphoric, perchloric, et cetera, that is, any strong acid containing an anion not subject to reactions either with chlorine or chlorine dioxide, and reasonably stable. The acid should be relatively concentrated in order that the reaction will proceed at a satisfactory rate and that substantially all of the chlorate added will be reacted. I have found that sulphuric acid with a molarity of at least 5 is preferred although sulfuric acid with a molarity of about 3.5 is still operative. In the case of phosphoric acid, a molarity of at least 7.5 is operative, however, a molarity of at least 10 is preferred.

The chlorate and chloride are used in substantially stoichiometric quantities and should be present in the reactor at concentrations below about 0.5 molar in order to obtain satisfactory yields of chlorine dioxide from the chlorate. Preferably, the concentrations of chlorate and chloride are maintained below about 0.1 molar. Broadly, the operative ranges may be stated as 0.5 to 0.01 molar chlorate and 0.3 to 0.001 molar chloride.

While sodium chloride and sodium chlorate are preferred for starting materials because of the relatively low cost of these salts, it is to be understood that other cations than sodium may be employed, so long as the salt is soluble in the acid solution employed, and will form in this acid solution chloric and hydrochloric acids. The reactions for the preparation of chlorine dioxide may be represented as follows:

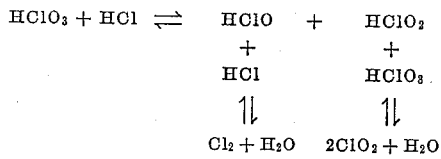

Since the chlorine and chlorine dioxide are gases at ordinary temperatures and have limited solubility in water, they are removed from the solution by an inert gas stream or by maintaining the generator under vacuum in order to keep the partial pressure of the chlorine dioxide within safe limits. The continuous removal of the gaseous reaction products causes the reactions forming them to proceed as indicated by the heavy arrows shown above and the chlorate and chloride in the generator are converted into chlorine dioxide and chlorine with nearly theoretical yield.

It is important that the concentration of chloride relative to that of chlorate be kept low in order that the rate of undesired reactions which produce only chlorine be kept to a minimum:

$$HClO_2 + HCl \rightarrow HClO + HClO$$

$$HClO + HCl \rightarrow Cl_2 + H_2O$$

I have found that the rate of the desired reaction increases as the acidity of the solution increases. Using sulphuric acid, for example, when the acid concentration is 2.5 molar, the reaction is relatively slow. As the acid concentration increases, the rate of reaction increases, as indicated by the increased rate of lowering the chlorate and chloride concentrations in the reaction solution when all other conditions are maintained constant.

If the acid concentration is increased above 6 molar with sulphuric acid, another reaction increases in rate, namely, that producing chlorine dioxide and perchloric acid, as follows:

$$3HClO_3 \rightarrow 2ClO_2 + HClO_4 + H_2O$$

While this reaction produces chlorine dioxide, one-third of the chlorate entering into this reaction is lost as perchloric acid, and this should be avoided. Therefore, 6.5 molar is considered to be the preferred upper limit of acidity advisable for carrying out the process here described when sulphuric acid is used. Where phosphoric acid is chosen, about 15 molar is the maximum allowing an efficient utilization of the chlorate to produce chlorine dioxide.

The desired reaction conditions can be maintained continuously in a vessel equipped with two liquor inlets below the surface of the liquor, one or more gas inlets in or near the bottom of the vessel, a tube suspended in the liquor above each gas inlet to promote rapid circulation of the liquor in the vessel, an overflow tube to maintain constant liquid level in the vessel and a gas outlet to remove the gaseous products of reaction. One liquor inlet introduces the acid, one the solution of chlorate and chloride, and the gas inlets usually admit air, but any other inert gas may be used.

The rate of feed of concentrated acid is adjusted to maintain the desired acidity in the liquid, and the rate of feed of a concentrated solution containing chlorate and chloride in substantially stoichiometric proportions is adjusted to maintain the desired rate of production of the mixture of chlorine dioxide and chlorine. While this discussion has described the mixing of chlorate and chloride and introduction of this mixture into the vessel, it is to be understood that mixing may occur in situ upon separate introduction of the two materials.

For fixed rates of flow of reactants, and a fixed volume of liquor maintained in the generator, a set of quasi-stationary conditions is reached in the reacting solution. The chlorate and chloride content of the reaction solution in the quasi-stationary state are interdependent and depend upon the chlorate and chloride concentration in the feed stream, the size of the vessel (which determines the retention time), and the temperature and acidity in the reacting solution. The ratio of chlorine dioxide to chlorine in the gaseous product is dependent on the chlorate and chloride concentrations in the reacting solution and on the temperature and acidity of this solution.

The yield of chlorine dioxide from the chlorate introduced is determined by the efficiency of the reaction, which is the proportion of the chlorate decomposed that is converted to chlorine dioxide, and by the fraction of the chlorate introduced which is left undecomposed in the effluent solution from the generator.

In a variation of my process, sodium acid sulphate may be crystallized out of the effluent solution, and the mother liquor, with the residual chlorate, chloride and acid, may be returned to the generator. In this case, the yield of chlorine dioxide is determined almost entirely by the efficiency of the reaction since undecomposed chlorate is re-circulated.

The process of the present invention has an additional advantage in that the starting or stopping of the process may be readily accomplished. The generation of chlorine dioxide may be stopped by merely stopping the flow of entering solutions, but maintaining the inert gas stream or partial vacuum until most of the chlorine dioxide has been swept from the reactor. Then the air may be stopped, or the vacuum broken. To start up, the air (or vacuum), acid and chlorate-chloride streams are started up. To change the rate of production of chlorine dioxide, it is only necessary to change the rates of flow of the three streams proportionately. This can be done by means of automatic interlocking controllers, if desired.

The following examples are given to illustrate the process of the present invention, but are not to be construed as limiting the invention thereto.

*Example 1*

Into a reactor of the type previously described, retaining approximately two liters of solution, a solution containing 3.19 moles per liter sodium chlorate, and 3.32 moles per liter sodium chloride was introduced continuously at the rate of 2.0 milliliters per minute through one liquid inlet below the surface of the liquid. Simultaneously, a solution of sulphuric acid containing fifteen moles per liter was introduced continuously at the rate of 1.5 milliliters per minute through the other liquid inlet. Air was introduced continuously in fine bubbles through a sintered glass diffuser at the rate of approximately 3.0 liters per minute. Liquor overflowed continuously from the reactor at approximately the combined rate of flow of the ingoing liquors, while the whole liquid mass was in continuous circulation caused by the gas rising in the central tube. After equilibrium was attained, the temperature was thirty degrees centigrade, and gas continuously flowed from the reactor. This gas contained a mole ratio of chlorine to chlorine dioxide, of 0.52, which represents an efficiency of conversion from chlorate to chlorine dioxide of 99.3 percent. The effluent solution was analyzed and found to contain 0.0508 mole chlorate and 0.0187 mole chloride per liter, and to be 5.19 molar in acid. Therefore, 97.5 percent of the ingoing chlorate reacted with 99.3 percent efficiency, giving an overall yield of 96.6 percent of the theoretically possible chlorine dioxide.

*Example 2*

The flow rate of fifteen molar $H_2SO_4$ was reduced to 1.0 milliliter per minute while the flow rate of chlorate-chloride solution was maintained at 2.0 milliliters per minute as in Example 1. After a steady state was attained, the generator temperature was thirty degrees centigrade, the effluent solution was 3.64 molar with respect to sulphuric acid and the chlorate and chloride concentrations were 0.263 and 0.176 molar respectively. The gas flowing from the reactor contained a molar ratio of chlorine to chlorine dioxide of 0.53, which represents an efficiency of conversion of chlorate to chlorine dioxide of 99.0 percent. By calculation 88 percent of the ingoing chlorate had reacted with 99 percent efficiency, giving an over-all yield of 87 percent. By recycling of the chlorate effluent, the over-all yield can be even higher.

*Example 3*

Into the same reactor 95 percent (17.5 molar) phosphoric acid was introduced continuously at a rate of 5.0 milliliters per minute, and simultaneously a chlorate-chloride solution of the same concentration was introduced continuously, as in Example 1, at the rate of 2.0 milliliters per minute. The temperature was maintained at 45 degrees centigrade by immersing the reactor in warm water. The air flow rate was about the same as in Example 1. Gas flowing from the reactor contained a mole ratio of chlorine to chlorine dioxide of 0.52. The effluent solution contained 0.019 mole per liter chlorate and 0.026 mole per liter chloride, and the acid was 10.8 molar. Therefore, approximately 98.2 percent of the ingoing chlorate reacted with 99.3 percent efficiency, giving an over-all yield of 97.7 percent.

Examples 1 and 2 illustrate the importance of the acidity of the reacting solution. If the acidity is sufficiently high, the rate of reaction is sufficiently rapid that the steady state concentrations of chlorate and chloride are very low, and the amount of chlorate unreacted is very low. Example 3 illustrates the use of phosphoric acid as the source of hydrogen ions. With this acid, only one of the three hydrogen ions appears to have a sufficiently high dissociation constant to be effective, and therefore, the molarity required is higher than that of sulphuric acid, in which both hydrogen ions appear to be effective.

While a solution containing a mixture of the chlorate and chloride was continuously fed into the reactor in the examples given above, these reactants may be introduced in two separate solutions, or as dry salts if desired, without affecting the essential conditions in the reacting solution.

The process operates satisfactorily at temperatures between fifteen degrees centigrade and seventy degrees centigrade, but since very little heat is produced or absorbed in the desired reaction, it is preferred to operate without cooling or heating. The reaction solution reaches an equilibrium temperature dependent on the concentration of acid introduced, the concentration of the chlorate-chloride solution introduced, the size of the vessel, the rate of air flow, and the temperatures of the ingoing solutions and the surrounding atmosphere. By adjusting some of these factors the temperatures can usually be maintained between thirty degrees centigrade and 45 degrees centigrade, without resorting to the use of heat exchangers in the reacting solution, which is very corrosive to most metals.

Various modifications may be made in the method of the present invention without departing from the spirit or scope thereof, and it is to be understood that I limit myself only as defined in the appended claims.

I claim:

1. A continuous process for producing gaseous chlorine dioxide and chlorine in an approximate two to one molar ratio by the reaction of a chlorate and a chloride in a strong acid solution, which comprises: maintaining a constant level in a single reactor containing a generating solution selected from the group consisting of (A) a solution which is 3.5 to 6.5 molar in sulfuric acid, 0.5 to 0.01 molar in chlorate and 0.3 to 0.001 molar in chloride, and (B) a solution which is 7.5 to 15 molar in phosphoric acid, 0.5 to 0.01 molar in chlorate, and 0.3 to 0.001 molar in chloride; continuously adding a substantially equimolar ratio of chlorate and chloride ions, in a molar concentration greater than the maximum in the generating solution and at a rate stoichiometrically equivalent to the amount of chlorine dioxide and chlorine produced; continuously adding an appropriate acid, selected from the group consisting of sulfuric acid and phosphoric acid, in a molar concentration greater than that of the acid in the generating solution and at a rate such that the concentration of acid in the generating solution remains relatively constant, thereby maintaining the composition of the generating solution within the reactor relatively constant; continuously removing the excess solution from the reactor, thus maintaining the level of the solution within the reactor constant; and, continuously removing the chlorine dioxide and chlorine thus produced.

2. A continuous process for producing gaseous chlorine dioxide and chlorine in an approximate two to one molar ratio by the reaction of a chlorate and a chloride in a strong acid solution, which comprises: maintaining a constant level in a single reactor containing a generating solution, in the temperature range twenty degrees to seventy degrees centigrade, selected from the group consisting of (A) a solution which is 3.5 to 6.5 molar in sulfuric acid, 0.5 to 0.01 molar in chlorate and 0.3 to 0.001 molar in chloride, and (B) a solution which is 7.5 to 15 molar in phosphoric acid, 0.5 to 0.01 molar in chlorate, and 0.3 to 0.001 molar in chloride; continuously adding a substantially equimolar ratio of chlorate and chloride ions, in a molar concentration greater than the maximum in the generating solution and at a rate stoichiometrically equivalent to the amount of chlorine dioxide and chlorine produced; continuously adding an appropriate acid, selected from the group consisting of sulfuric acid and phosphoric acid in a molar concentration greater than that of the acid in the generating solution and at a rate such that the concentration of acid in the generating solution remains relatively constant thereby maintaining the composition of the generating solution within the reactor relatively constant; continuously removing the excess solution from the reactor, thus maintaining the level of the solution within the reactor constant; and, continuously removing the chlorine dioxide and chlorine thus produced.

3. A continuous process for producing gaseous chlorine dioxide and chlorine in an approximate 2 to 1 molar ratio by the reaction of a chlorate and a chloride in a sulfuric acid solution which comprises: maintaining a constant level in a single reactor containing a generating solution, in the temperature range between about twenty and about seventy degrees centigrade, which generating solution is 3.5 to 6.5 molar in sulfuric acid, 0.5 to 0.01 molar in chlorate, and 0.3 to 0.001 molar in chloride; continuously adding a substantially equimolar ratio of chlorate and chloride ions in a molar concentration greater than the maximum chlorate-chloride concentration in the generating solution, and at a rate stoichiometrically equivalent to the amount of chlorine dioxide and chlorine produced; continuously adding sulfuric acid in a molar concentration greater than that of the sulfuric acid in the generating solution and at a rate such that the concentration of acid in the generating solution remains relatively constant, thereby maintaining the composition of the generating solution in the reactor relatively constant; continuously removing the excess solution from the reactor, thus maintaining the level of the solution within the reactor constant; and continuously removing the chlorine dioxide and chlorine thus produced.

4. A continuous process for producing gaseous chlorine dioxide and chlorine in an approximate 2 to 1 molar ratio by the reaction of a chlorate and a chloride in a phosphoric acid solution, which comprises: maintaining a constant level in a single reactor containing a generating solution, in the temperature range between about twenty and about seventy degrees centigrade; which generating solution is 7.5 to 15.0 molar in phosphoric acid, 0.5 to 0.01 molar in chlorate, and 0.3 to 0.001 molar in chloride; continuously adding a substantially equimolar ratio of chlorate and chloride ions, in a molar concentration greater than the maximum chlorate-chloride concentration in the generating solution, and at a rate stoichiometrically equivalent to the amount of chlorine dioxide and chlorine produced; continuously adding phosphoric acid in a molar concentration greater than that of the phosphoric acid in the generating solution and at a rate such that the concentration of acid in the generating solution remains relatively constant, thereby maintaining the composition of the generating solution in the reactor relatively constant; continuously removing the excess solution from the reactor, thus maintaining the level of the solution within the reactor constant; and continuously removing the chlorine dioxide and chlorine thus produced.

References Cited in the file of this patent

UNITED STATES PATENTS

| | | |
|---|---|---|
| 2,317,443 | Cunningham | Apr. 27, 1943 |
| 2,332,181 | Soule | Oct. 19, 1943 |
| 2,373,830 | Holst | Apr. 17, 1945 |

FOREIGN PATENTS

| | | |
|---|---|---|
| 377,376 | Great Britain | July 28, 1932 |
| 537,557 | Great Britain | June 26, 1941 |